Figure 1:
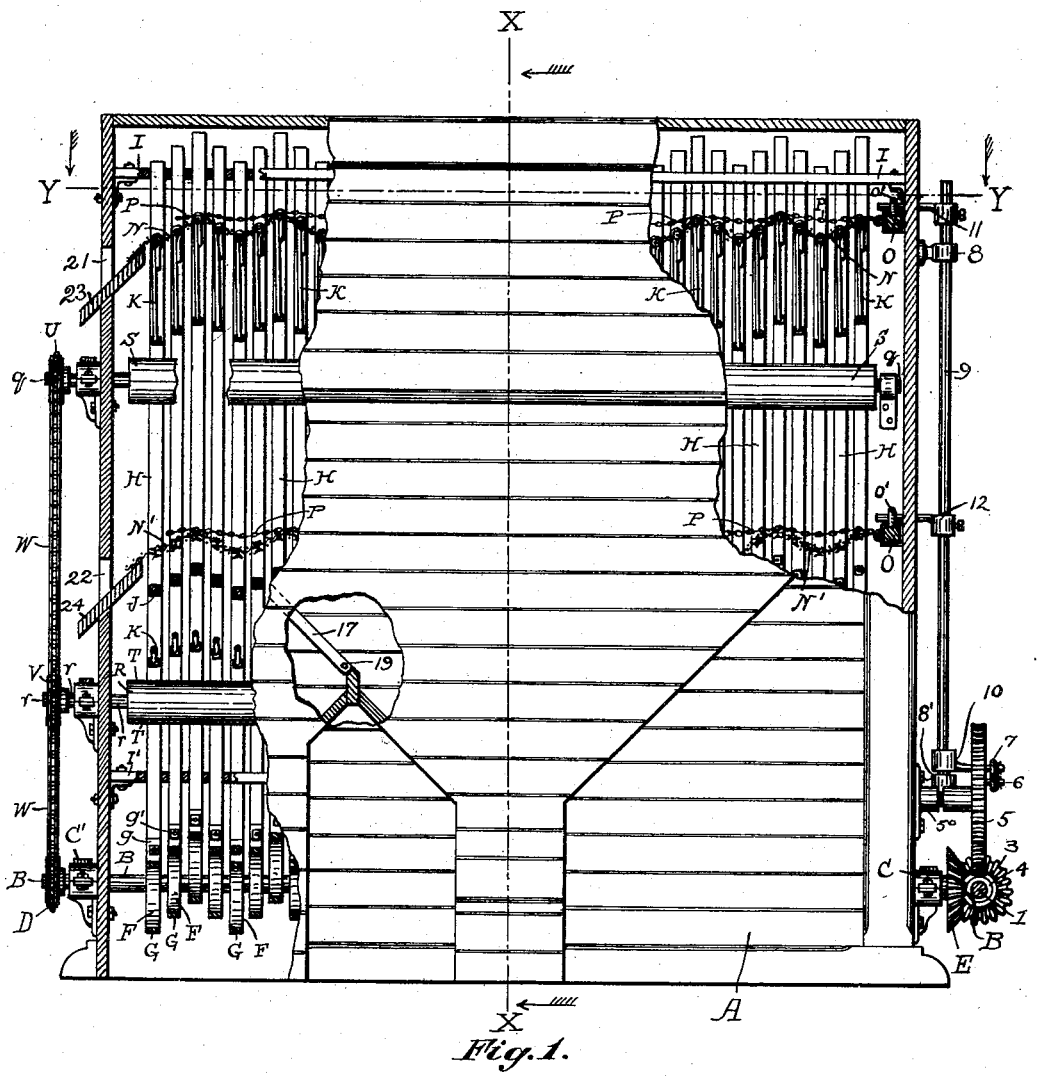

No. 735,730. PATENTED AUG. 11, 1903.
E. R. DRAVER.
UNDULATORY BOLTING MACHINE.
APPLICATION FILED SEPT. 11, 1902.
NO MODEL. 4 SHEETS—SHEET 1.

Witnesses:
J. C. Duvall.
R. E. Randle.

Inventor:
EMIL. R. DRAVER;
by his attorney,
Robert W Randle

No. 735,730. PATENTED AUG. 11, 1903.
E. R. DRAVER.
UNDULATORY BOLTING MACHINE.
APPLICATION FILED SEPT. 11, 1902.
NO MODEL. 4 SHEETS—SHEET 3.

Witnesses.
S. C. Duvall.
R. E. Randle

Inventor:
EMIL R. DRAVER,
by his attorney,
Robert W. Randle.

No. 735,730. PATENTED AUG. 11, 1903.
E. R. DRAVER.
UNDULATORY BOLTING MACHINE.
APPLICATION FILED SEPT. 11, 1902.
NO MODEL. 4 SHEETS—SHEET 4.

Witnesses:
S. C. Duvall.
R. E. Randle.

Inventor:
EMIL R. DRAVER;
by his attorney,
Robert W. Randle.

No. 735,730. Patented August 11, 1903.

UNITED STATES PATENT OFFICE.

EMIL R. DRAVER, OF RICHMOND, INDIANA.

UNDULATORY BOLTING-MACHINE.

SPECIFICATION forming part of Letters Patent No. 735,730, dated August 11, 1903.

Application filed September 11, 1902. Serial No. 122,906. (No model.)

*To all whom it may concern:*

Be it known that I, EMIL R. DRAVER, a citizen of the United States, residing in the city of Richmond, in the county of Wayne and State of Indiana, have invented new and useful Improvements in Undulatory Bolting Mechanisms; and I do hereby declare the following to be a full, clear, and exact description of the invention, such as will enable others skilled in the art to which it appertains to make and use the same.

This invention relates to a mechanism composed of interdependent and coöperating parts arranged to be operated by power for the purpose of bolting and separating flour.

My present invention relates to undulatory bolting mechanism adapted for the separation of the constituents of ground farinaceous products.

The principal object of my invention is the provision of a machine for treating and separating ground grain or the like in which undulatory or wave-like motions are imparted to the bolting-cloths and at the same time a lateral forward movement is imparted to carry the unbolted product over the surface of the bolting-cloth and means whereby the constituents of the ground grain are separated and deposited into their respective chutes or receptacles.

Another object in view is to provide a simple, durable, and positive means for imparting to horizontal bolting-cloths oppositely-disposed undulatory movements, which movements follow each other laterally in progressive sequence.

Another object is the provision of undulatory bolting mechanisms composed of a minimum of parts consistent with the various operations which it is intended to perform, which will be simple in character, compact in form and construction, easily operated and maintained, and whereby the operator will be enabled to control the mechanisms so that its work will be performed with certainty and precision; and another object is the provision of a new article of manufacture in an undulatory bolting mechanism which can be manufactured and sold at a comparatively low price.

Other objects and advantages of my invention will appear from the following specification and from the drawings forming a part thereof.

My improvements herein set forth render the production of perfectly bolted and graded flour or the like practical with a minimum of machinery and mechanical energy, solving many of the most serious problems that have stood in the way of the practical attainment of that end.

My invention consists in an undulatory bolting mechanism embodying certain new and useful features and details of construction and relative disposition of parts, as hereinafter particularly set forth, illustrated in the drawings, and incorporated in the claims hereunto appended.

In detail the invention relates to undulatory bolting mechanisms substantially as shown in the accompanying drawings, in which—

Figure 2:
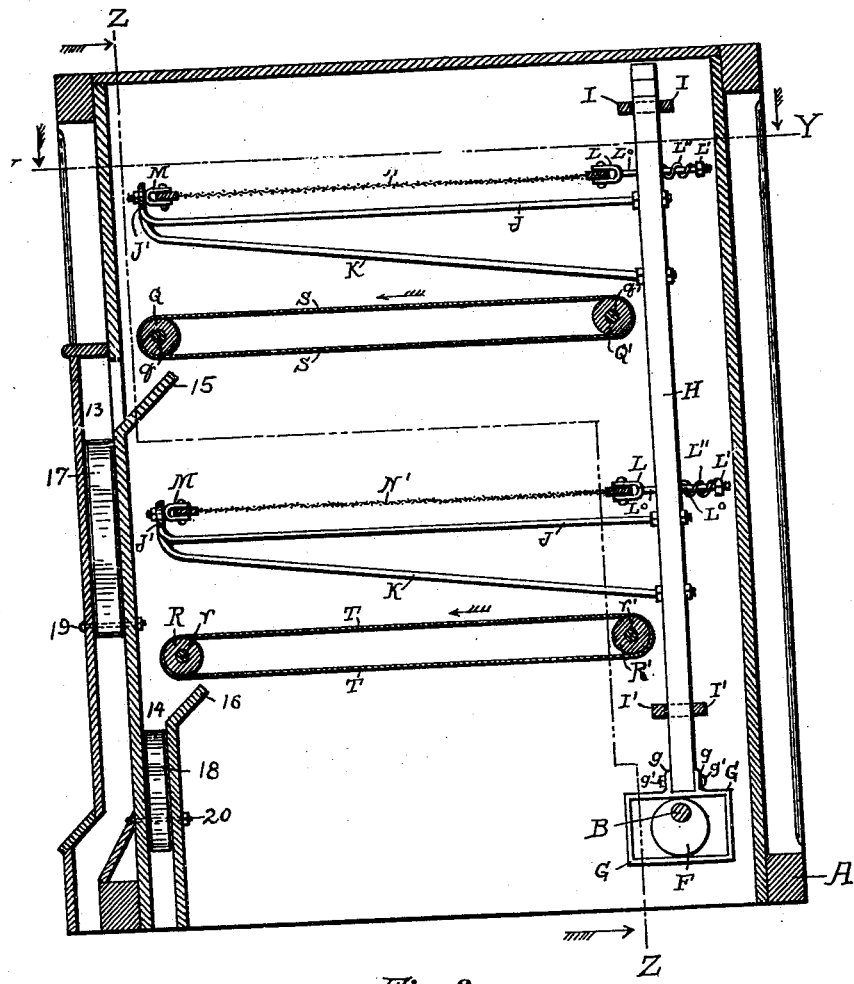
Figure 3:
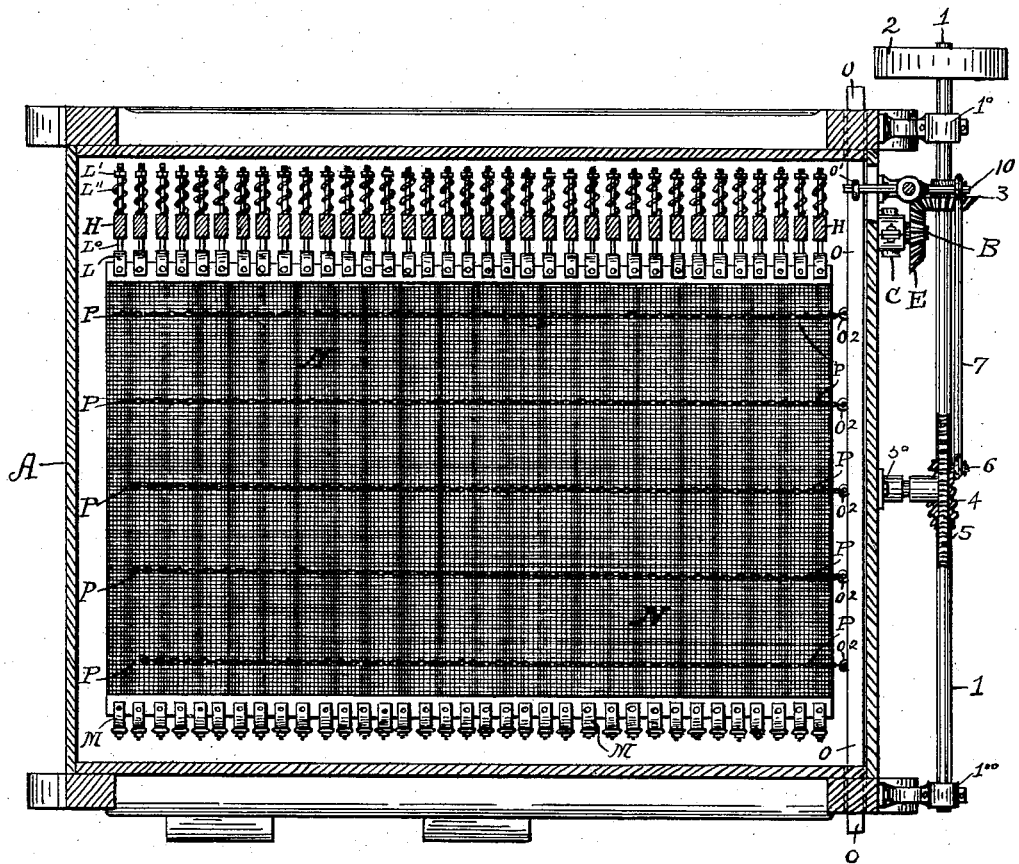
Figure 4:
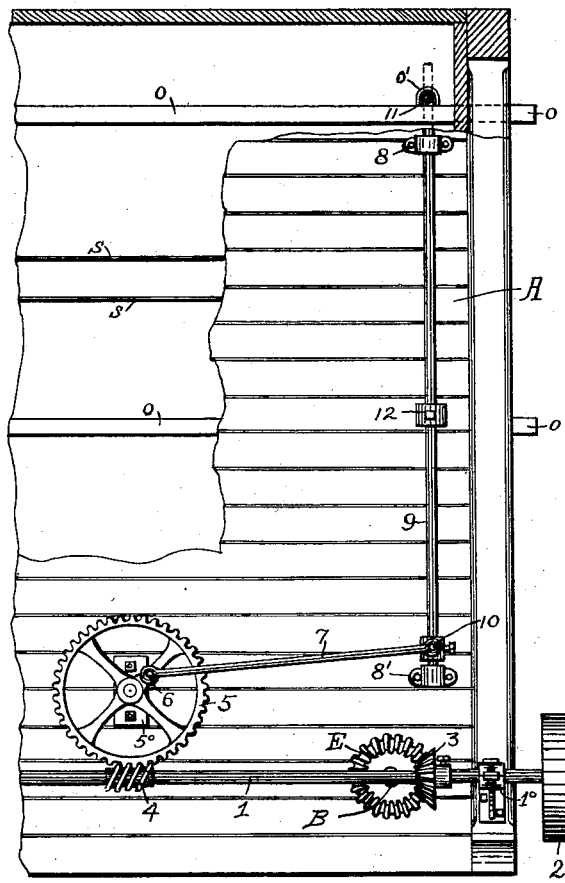
Figure 5:
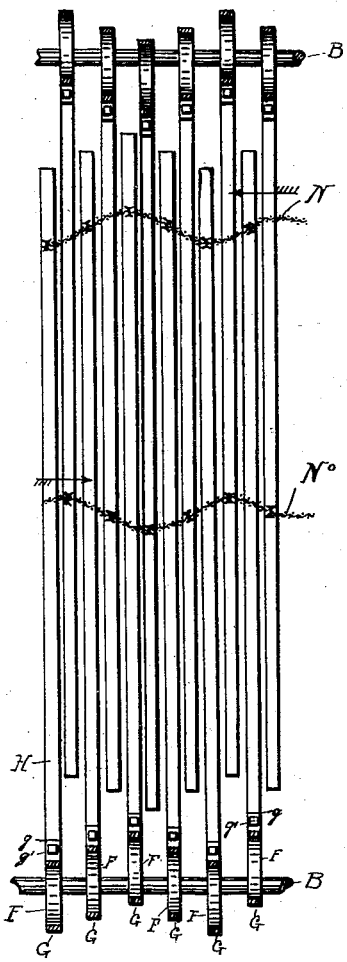
Figure 6:
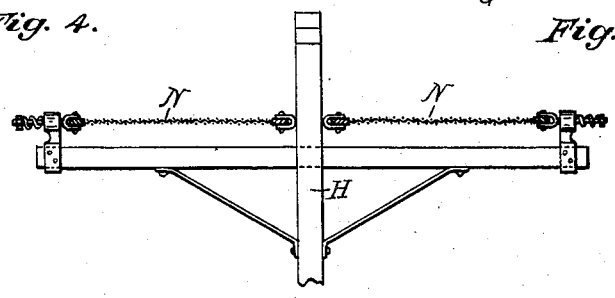

Figure 1 is a longitudinal elevation of my invention, partly in section, and portions being broken away to show the interior mechanisms. Fig. 2 is a central sectional elevation of my machine, taken on the line X X of Fig. 1. Fig. 3 is a horizontal plan section of my machine, taken on the lines Y Y of Figs. 1 and 2. Fig. 4 is a detail view showing a side elevation of a portion of my machine and operating mechanisms. Fig. 5 is a detail showing modifications of portions of my invention. Fig. 6 is a detail also showing modifications of portions of my invention.

Similar indices refer to similar parts throughout the several views.

In the drawings, A denotes the bolting or containing chest, consisting, primarily, of four perpendicular sides, a top, and a bottom of any well-known construction, forming substantialy an oblong box, secured together by bolts and screws in any well-known manner, and it is adapted to contain the bolting mechanisms, substantially as shown in the drawings.

Extending through the chest A, preferably near the bottom and to one side thereof, the ends projecting through and beyond the opposite side thereof, is a main shaft B. Said main shaft B is revolubly mounted near each of its ends by the hangers C and C', which are secured to opposite sides of the chest A, substantially as shown in Fig. 1.

To one end of the shaft B is attached the sprocket-wheel D, and to the opposite end is secured the major miter gear-wheel E. The purpose of said wheel E will hereinafter appear.

On the inside of the chest A to the shaft B is secured at frequent intervals a number of eccentrics F, so arranged as to produce wave-like lines on the apex of the peripheries of said eccentrics from right to left when the shaft B, to which they are connected, is revolved. Adapted to surround each of the eccentrics F are the eccentric-straps G, whose interior diameter vertically is only slightly greater than the diameter of the eccentrics F and whose diameter horizontally is substantially double the diameter of the eccentrics F. Rising from the upper center portions of each of the straps G are pairs of hangers $g$, adapted to receive between them the bars or standards H and to secure said bars or standards thereto by the bolts $g'$, as shown in the drawings.

Extending upward perpendicularly from each of the straps G, secured thereto as stated, are standards H, above referred to, which extend to near the top of the interior of the chest A, as shown in Figs. 1 and 2. The standards H are supported and guided vertically by the guide-blocks I and I', located between the sides and near the top and bottom, respectively, of the chest A, and the standards H are adapted to be moved up and down in apertures in said guide-blocks, substantially as shown in the drawings.

Extending out at right angles from the standards H, to which they are secured by nuts, and extending to near the opposite side of the interior of the chest A, are the arms or brackets J, which are supported at their outer ends by the braces K, also secured to the standards H, and are attached to the free ends of the brackets J. The free ends of the brackets J are turned up at right angles to their body portions to form fingers J' for the purpose hereinafter appearing.

L represents clevises, the shanks $L^0$ of which loosely passing through holes in the standards H above the brackets J and projecting outward some distance, their extreme outward ends being provided with nuts L' thereon, and a coil-spring L'' is placed around the projecting end portions of the shanks $L^0$ between the nuts L' and the outer face of the standard H in order that the tension on the springs L'' may normally keep the shoulders of the clevises L against the opposite face of the standard H in order to suspend and stretch the bolting-cloths, which may be secured by the clevises. A similar but oppositely-disposed clevis M is swivelly mounted in the upwardly-projecting finger J' of the bracket J, as shown.

The letters N and N' represent bolting-cloths pivotally attached at their sides to the clevises L and M, as shown in Fig. 2, and they are kept sufficiently stretched by means of the springs L'', as above stated.

Slidably mounted horizontally across the right-hand side of the machine on a line with the bolting-cloth N are the laterally-movable arms O, carried by suitable hangers attached to the sides of the chest A, with eyes O' extending up therethrough and eyes $O^2$ extending out therefrom, as shown. Secured in the eyes $O^2$ are chains, cords, or the like, as indicated by the letter P, which lie on the surface of the bolting-cloths, the opposite ends of said chains or cords being free and entirely detached, as shown in Fig. 3.

Revolubly mounted on the outside of the chest A on a level with the shaft B and at right angles thereto is a shaft 1, carried by suitable hangers $1^0$ and $1^{00}$, secured to the side of the chest A. One end of the shaft 1 projects beyond the corner of the chest A and is provided with a pulley 2. Secured on the shaft 1 is the minor miter gear-wheel 3, which meshes with the miter gear-wheel E, which it is adapted to rotate. On the shaft 1 is also secured a perpetual screw-gear 4, and above and meshing therewith at right angles thereto is the cog gear-wheel 5. The wheel 5 is revolubly mounted to the outside of the chest A by the hanger $5^0$, as shown, and extending out from one of the arms of the wheel 5 is the pivot 6, to which is mounted one end of the pitman-rod 7.

Secured to the side of the chest A near the corner are the two hangers 8 and 8', one above and one below, to carry the vertical rocking shaft 9. Secured near the lower end of the shaft 9 is an outwardly-extending finger 10, the outer extremity of which is pivoted to one end of the pitman 7. (Shown in Fig. 4.) Secured to the shaft 9 near the top and center thereof are the two inwardly-projecting fingers 11 and 12, the ends of which pass through apertures in the side of the chest A, and the points engage in the eyes O' of the arm O, as shown.

Extending across the interior of the chest A at right angles to the standards H and below each of the series of clevises L and M are pairs of rollers Q and Q' and R and R', provided with shafts $q$ and $q'$ and $r$ and $r'$, respectively, which extend through and beyond said rollers at each end, where they are journaled in suitable hangers, as shown. Extending over and between each pair of rollers Q and Q' are non-porous carriers S and T. The surfaces of said carriers are immediately below the respective bolting-cloths N and N', as shown in Fig. 2. One end of each of the axles $g$ and $r$ extend out beyond the side of chest A, to which extensions are secured the respective ratchet-wheels U and V, which are on a line with the ratchet-wheel D and are connected thereto by the ratchet-chain W.

One side of the chest A is provided with flour-conveying chutes to receive the bolted flour from the carriers S and T, as shown to the extreme left in Fig. 2.

13 represents the chute from the upper carrier, and 14 the chute from the lower carrier. 15 and 16 represent the respective deflector-boards, extending inward at an angle underneath the rollers Q and R in order that the flour passing from the carriers S and T will be conducted into the respective chutes 13 and 14.

Below the mouths of each of the chutes 13 and 14 said chutes are divided into two branches. The dividing-points of each are supplied with deflecting-boards or valves 17 and 18, respectively, the lower ends of which are pivoted by the respective bolts 19 and 20, by which it is apparent that the flour falling into the chutes 13 and 14 may be divided or caused to flow into one or the other of the branches of the respective chutes. The flour sifting through the bolting-cloths N and N' onto the carriers S and T will be carried by the latter at right angles to the direction the product is carried by the waves of bolting-cloth, so that the different grades sifted through the bolting-cloth can be kept separate. The flour sifted through the bolting-cloth near the discharge or tail end is not as clear and free from specks as that sifted through the bolting-cloth toward the head or feed end and should be kept separate, the specky or clear flour being sent to other machines for further treatment, the division being accomplished by changing the angle of the valve or deflector boards 17 and 18.

On the side of the machine at right angles to the side on which the chutes above described are located and below the line of the bolting-cloths N and N' are openings 21 and 22, through which unbolted products from the surfaces of the bolting-cloths N and N' may pass and by means of the deflecting-boards 23 and 24, set at an angle, as shown in Fig. 1, and the tail ends of the bolting-cloths attached to the upper edges of the respective boards 23 and 24, it will be seen that the unbolted products passing from the bolting-cloths N and N' will pass downward over the respective boards 23 and 24 into receptacles provided for that purpose.

On the standards H two sets of brackets carrying bolting-cloths are shown, one above the other; but it will be apparent that one set of brackets carrying bolting-cloths can be used or that three or more sets may be used one above the other, depending entirely upon the length of the standards and the height of the containing-chest.

In Fig. 5 I have shown some slight modifications of the arrangement above described, in which two sets of oppositely-disposed standards H and arms or brackets J are arranged alternately and in which two shafts B are used, one above and the other below, as shown, the bolting-cloth N being connected to the upwardly-extending arms, as above described, and the bolting-cloth N' being connected to the downwardly-extending arms, the upper and lower sets of eccentrics being so attuned that the revolutions of the two shafts will cause wave-like motions of the two bolting-cloths N and N', the former traveling from right to left and the latter from left to right, as indicated by the arrows.

In Fig. 6 I have also shown some modifications which may under some conditions be desirable, the main features being that the capacity of the chest A may be doubled without a material increase in the amount of machinery. In this case the main shaft B is placed across the center of the chest A, and the standards H are provided with double lateral arms or brackets J, carrying bolting-cloths extending laterally in opposite directions therefrom, and the two sets of oppositely-disposed bolting-cloths will be carried by the standards H, thus practically doubling the capacity of the standards H and, in fact, of the entire machine.

I desire it to be understood that it is within the scope of my invention that the upper ends of the standard H, Fig. 6, may be flush with the upper edge of the horizontal bars, and the bolting-cloth may extend from the upturned fingers at one end of the horizontal bar to the upturned fingers at the other end of the bar. It is also obvious that the standard H may be dispensed with and the eccentric-bearing may be secured directly to the horizontal bar, as the bolting-cloth supports are in shape of a yoke and spanning said bolting-cloth and adapted to be bodily raised and lowered. It is also obvious that the yokes or brackets may be reversed, so as to support the bolting-cloth below them.

Operation: Power being applied to the pulley 2 to revolve it, the shaft 1 will also be revolved, carrying the miter gear-wheel 3 and it in turn the miter gear-wheel E, which latter will revolve the shaft B. The eccentrics F, secured to the shaft B, will be carried thereby, and they in turn will cause the standards H to move up and down in the guides I and I', carrying the bolting-cloths up and down in unison therewith, the standards H being attuned by the arrangement of the eccentrics to move the bolting-cloths in progressive wave-like undulations from one end to the other thereof. At the same time the screw 4 will revolve the wheel 5, by which the pitman 7, operating on the finger 10, will give the shaft 9 an oscillating or rocking motion, imparting to the fingers 11 and 12 a backward and forward motion, and they being in the eyes O' of the arms O they will also be given a backward and forward endwise motion. The chains or cords P being connected at one end to the arms O they will be moved back and forth over the bolting-cloths N and N', being inclined to be kept extended, as shown in Fig. 3, by the action of the wave-like motions imparted to the bolting-cloths by the standards H, and by the lateral movements of the chains or cords P and the wave-like motions of the bolting-cloths it is apparent that at frequent intervals of time all parts of the surface of the bolting-cloths will be touched by the chains or cords, thus assisting in cleaning the bolting-cloths and facilitating the entering of the finer particles of the flour therethrough. The rollers Q and Q' and R and R', carrying the respective carriers S and T in the direction of the arrows, and the bolting-cloths N and N' being projected above the surfaces thereof, it will be apparent that the bolted flour falling from the bolting-cloths N and N' will fall onto the carriers S and T, respectively, and will be carried by the latter at right angles to the wave-like motions of the bolting cloths and deposited into the respective chutes 13 and 14, where it may be graded by means of the deflecting-boards 17 and 18, as shown and described. It will now be seen that the constituents of the ground grain deposited on the bolting-cloths, toward the left-hand ends thereof when referring to Fig. 3, the machine being in operation as above described, that the ground grain will be carried along on the bolting-cloths to the left by the undulating wave-like motions referred to and that the fine or bolted particles of the grain will pass through the bolting-cloths and will fall onto the moving carriers S and T and be carried by them to the respective chutes 13 and 14, and the coarser particles of the grain and foreign matter will be carried over the tail end of the bolting-cloths and deposited outside the chest through the respective apertures 21 and 22.

My invention is perfectly adapted to accomplish the results for which it is intended, and it is evident that changes in and modifications of the specific construction herein shown and described may be made, and that analogous parts may be used to accomplish the same results without departing from the spirit of my invention or sacrificing any of its many advantages, and the specific construction of the details of my invention may be variously changed without altering the essential principles, which are claimed as new.

The terms "upward," "downward," "right," "left," and other similar terms are used for convenience of description, and it is not intended by their use to limit the arrangement of the several parts to the exact positions indicated; but they may be variously changed and modified to suit the various requirements of different types of machines of this character.

I wish it to be understood that I do not dedicate any part of my invention to the public, and that I wish adequate and just protection for every feature of the invention that is new and useful and which involves invention.

Having now fully shown and described my invention and the best mode for its construction and use to me known at this time, what I claim as new, and desire to secure by Letters Patent of the United States, is—

1. In a bolting-machine the combination with a containing-chest, of a bolting-cloth fixedly secured at opposite edges to a series of vertically-movable supports, means for moving said supports to produce wave-like motions to the bolting-cloth, chains or cords resting on the surface of the bolting-cloth and secured at one end to a horizontal reciprocating bar by which the chains or cords are moved laterally over the surface of the cloth, substantially as shown and described.

2. In a bolting mechanism embodying in combination an inclosing chest, series of bolting-cloths suspended horizontally therein by tension and mounted on vertically-operating brackets moved in succession to produce undulations of the bolting-cloths toward one of the sides of the chest; series of chains or cords lying upon the surface of the bolting-cloths and attached at one end to a horizontal reciprocating bar, a rocking shaft operated by a pitman and a gear-wheel connected to the power-shaft by which said reciprocating bar is operated; means for driving the shaft for operating the vertical standards; and carriers mounted on rollers below the bolting-cloths for conducting the bolted flour to the respective chutes, all substantially as shown and described.

3. In a bolting-machine the combination of a containing-chest, a bolting-cloth fixedly secured at opposite edges to a series of vertically-moving supports, a series of bars connecting said supports in pairs at opposite edges of the cloth, a series of eccentrics for bodily raising and lowering said bars and supports and adapted by their vertical reciprocations to produce wave-like motions to the bolting-cloth, as and for the purposes set forth.

In testimony whereof I have hereunto signed my name to this specification in the presence of two subscribing witnesses.

EMIL R. DRAVER.

Witnesses:
R. E. RANDLE,
R. W. RANDLE.